(12) United States Patent
Jackson

(10) Patent No.: US 7,821,521 B2
(45) Date of Patent: Oct. 26, 2010

(54) METHODS AND SYSTEMS FOR LEGACY GRAPHICS EMULATION

(75) Inventor: Adam Jackson, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 719 days.

(21) Appl. No.: 11/680,282

(22) Filed: Feb. 28, 2007

(65) Prior Publication Data

US 2008/0204473 A1     Aug. 28, 2008

(51) Int. Cl.
*G09G 5/37* (2006.01)
(52) U.S. Cl. ..................... 345/561; 345/581; 345/582; 345/586; 345/606; 345/619; 345/552; 345/562
(58) Field of Classification Search ..................... None
See application file for complete search history.

(56) References Cited

U.S. PATENT DOCUMENTS 5,487,051 A * 1/1996 Providenza et al. .... 365/233.14
5,751,295 A * 5/1998 Becklund et al. ........... 345/503
7,167,184 B2 * 1/2007 Graham ...................... 345/592

* cited by examiner

*Primary Examiner*—Antonio A Caschera
(74) *Attorney, Agent, or Firm*—MH2 Technology Law Group LLP

(57) ABSTRACT

Embodiments of the present invention provide a seamless way to emulate legacy graphics processing on modern graphics hardware. In particular, in some embodiments, the present invention provides a way for modern GPUs to emulate the bitwise operations and rendering processes of previous generations of graphics hardware. The present invention utilizes a novel pixel shader program. The pixel shader program provides a texture lookup functionality that compensates for any missing bitwise functionality. When a bitwise operation is requested, the system will copy out the destination area to a temporary image. This temporary image is fed to the pixel shader program along with a precomputed texture. The texture is precomputed by the CPU for the various bitwise operations and acts as a lookup table for the requested operation. With the temporary image and precomputed texture, the shader program on the GPU can then emulate the legacy graphics operations seamlessly. Accordingly, all temporaries, and the emulation of the bitwise operations themselves are done using the three dimensional engine of the GPU.

22 Claims, 2 Drawing Sheets

METHODS AND SYSTEMS FOR LEGACY GRAPHICS EMULATION

FIELD OF THE INVENTION

The present invention relates to computer graphics, and more particularly, it relates to legacy graphics emulation.

BACKGROUND OF THE INVENTION

In computing, one of the common windowing systems is the X Window system (or X11 or X). The X Window System provides a windowing graphical user interface for Unix and Unix-like operating systems, such as Linux, and remains popular to this day.

The rendering processes for displaying graphics on a computer display in the X Window System were originally designed for earlier generations of hardware. Early graphics hardware allowed application to utilize low level bitwise operations. This allowed applications to easily create simple effects, such as, the drawing and erasing of transient figures using exclusive- or combinations, transparent windows, the pasting of icons onto black fields using inclusive- or, etc. Currently, there is still a large body of application code that utilizes the classic rendering processes provided by the X Window System.

However, modern graphics hardware has moved to a more complex and more general model. Instead of executing single operations at a time, modern graphics processing units (GPUs) have execution pipelines where multiple operations are executed at once. In addition, GPUs no longer provide bitwise operations offered in previous generations of hardware. Instead, GPUs provide more complex arithmetic operations and rendering operations are controlled by an application using "shader programs." Shader programs can be executed by the GPU, giving much more flexibility in the range of rendering operations available. Unfortunately, the newer generations of GPUs and shader programs are incompatible with the older application base for X Window Systems.

Modern display systems offer increased performance, better graphics quality, and a larger feature set for application programmers. However, for compatibility reasons with the large base of legacy applications, the old bitwise operations need to continue to work as before.

Currently, if a legacy X Window System application is running on newer GPUs, the legacy rendering processes are offloaded from the GPU and returned to the CPU for execution in a software process. Unfortunately, this results in decreased performance. Moreover, the increase in CPU load hurts the interactive performance of the running application.

Accordingly, it would be desirable to provide methods and systems that allow legacy graphics processing to operate efficiently with the newer graphics hardware.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

DESCRIPTION OF THE EMBODIMENTS

Embodiments of the present invention provide a seamless way to emulate legacy graphics processing on modern graphics hardware. In particular, in some embodiments, the present invention provides a way for modern GPUs to emulate the bitwise operations and rendering processes of previous generations of graphics hardware by utilizing a novel pixel shader program.

In one embodiment, the shader program has been enhanced to emulate X Window bitwise operations and Graphic Device Interface (GDI) operations and operate from more than the typical three source texture input (the basic three being the source image, the destination image, and the lookup texture). In another embodiment, the shader program is repeatedly applied to emulate planemasks.

The pixel shader program provides a texture lookup functionality that compensates for any missing bitwise operation functionality. When a bitwise operation is requested, the system will copy out the destination area to a temporary image. This temporary image is fed to the pixel shader program along with a precomputed texture. The texture is precomputed by the CPU for the various bitwise operations and acts as a lookup table for the requested operation. With the temporary image and precomputed texture, the shader program on the GPU can then emulate the legacy graphics operations seamlessly. Accordingly, all temporaries, and the emulation of the bitwise operations themselves are done using the three dimensional engine of the GPU.

Reference will now be made in detail to the exemplary embodiments of the invention, which are illustrated in the accompanying drawings. Wherever possible, the same reference numbers will be used throughout the drawings to refer to the same or like parts.

Figure 1:
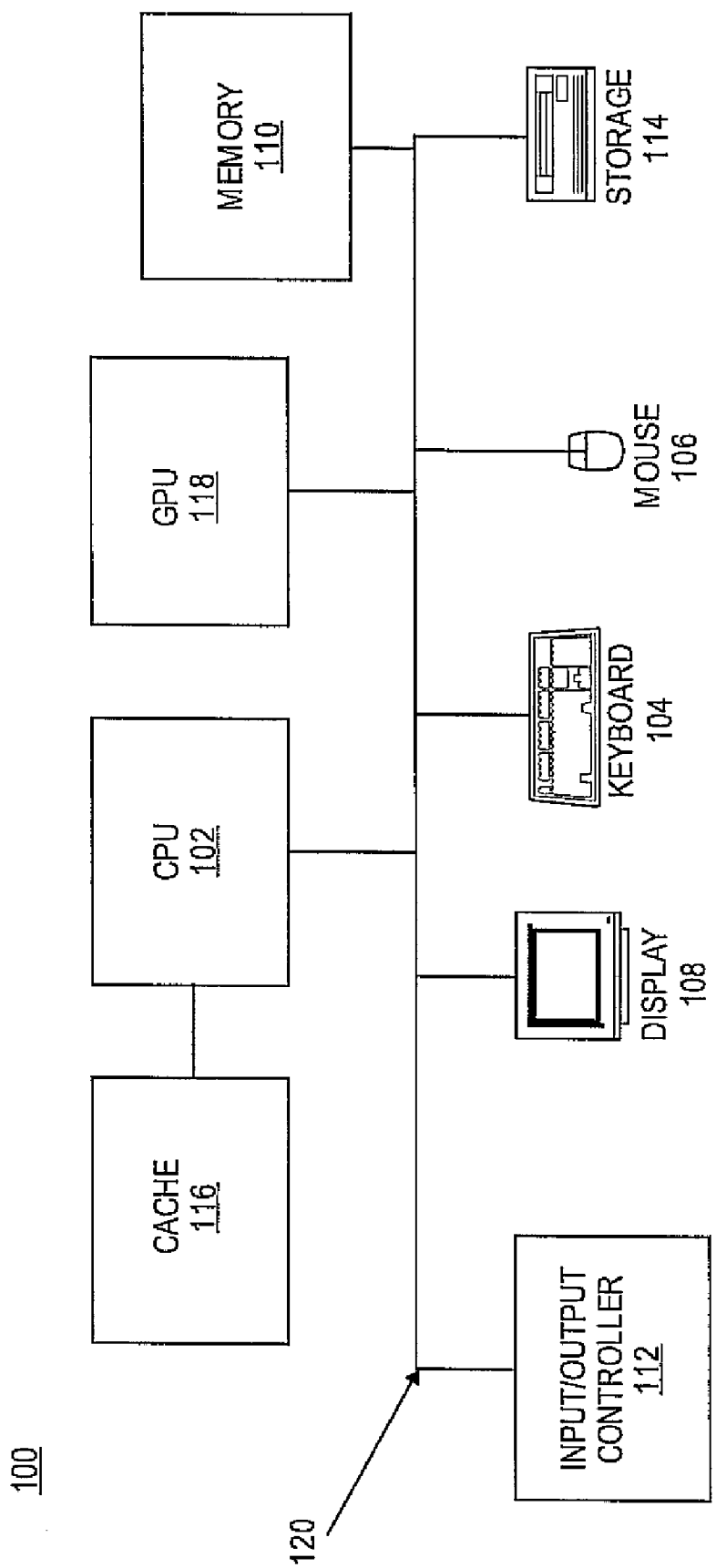
FIG. 1 illustrates a computer system in which the present invention may be implemented.

FIG. 1 illustrates a computer system 100 that is consistent with the principles of the present invention. For purposes of explanation, FIG. 1 illustrates a general purpose computer, such as a personal computer, which may implement embodiments of the present invention. Examples of the components that may be included in computer system 100 will now be described.

As shown, a computer system 100 may include a central processor (CPU) 102, a keyboard 104, a pointing device 106 (e.g., mouse, or the like), a display 108, a main memory 110, an input/output controller 112, and a storage device 114. Processor 102 may further include a cache memory 116 for storing frequently accessed information and graphics processing unit 118. Cache 116 may be an "on-chip" cache or external cache. System 100 may also be provided with additional input/output devices, such as a printer (not shown). The various components of the system 100 communicate through a system bus 120 or similar architecture.

Figure 2:
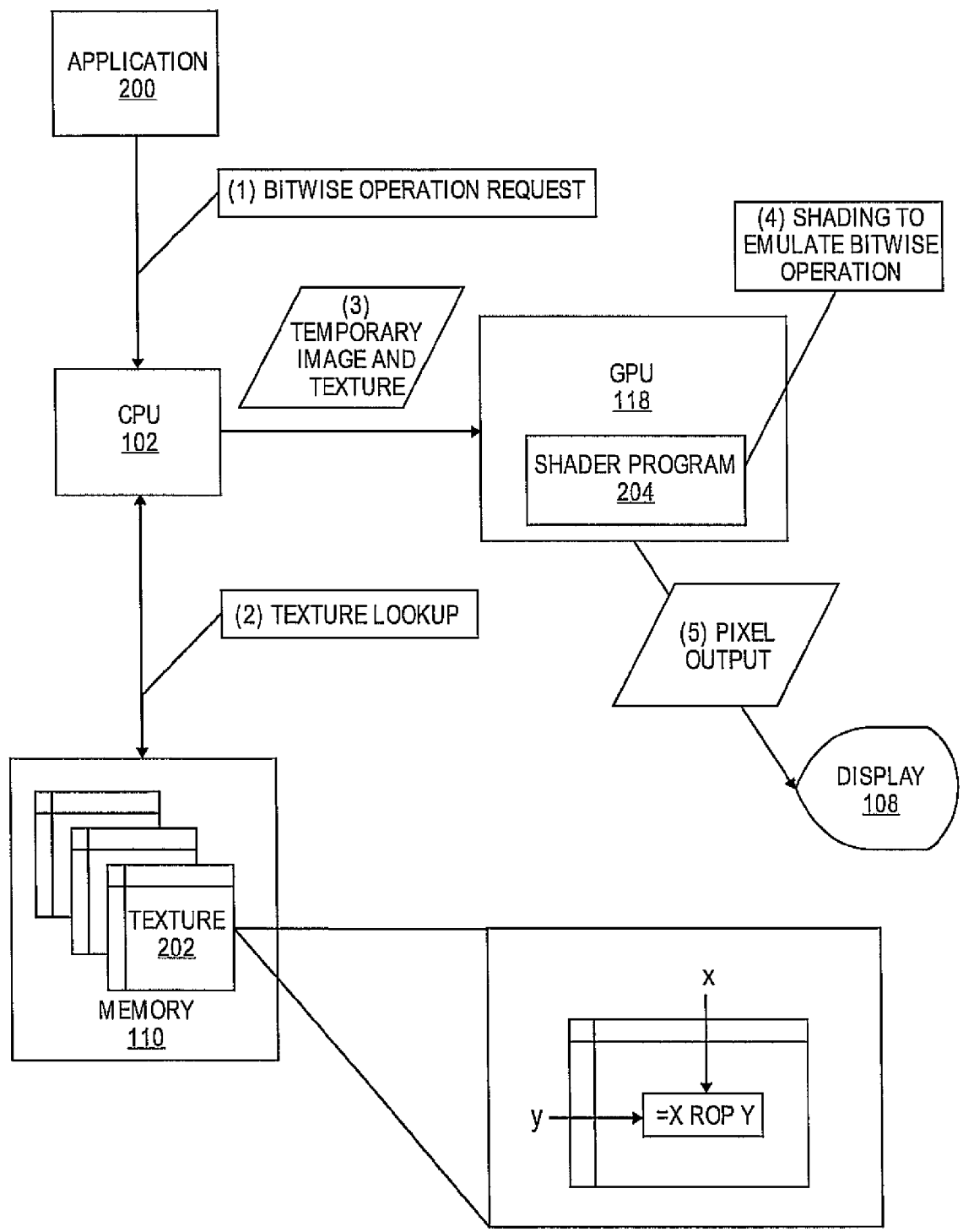
FIG. 2 illustrates an exemplary execution sequence that may be used to emulate legacy graphics.

In order to illustrate the principles of the present invention, FIG. 2 is provided to illustrate an exemplary execution sequence of the present invention that is used to emulate legacy graphics. An application 200 is initially shown requesting a graphics operation. In particular, application 200 may be an X Window System application that is requesting a bitwise operation or another type of windowing application that is requesting a GDI operation. Accordingly, as shown, application 200 submits requested bitwise operation to CPU 102.

In general, the present invention may encompass a variety of bitwise (or raster) operations provided by the X Window System or in GDI systems. In particular, the present invention may be used to provide compatibility for X Window binary operations and GDI binary, ternary, and quaternary operations, as well as the use planemasks. By way of example, the present invention may implement the complete set of 2-operand (i.e., binary) bitwise operations, such as AND, OR, and XOR. The following table 1 provides a list of the bitwise operations that are implemented by embodiments of the present invention.

TABLE 1

| Name of Operation | Minimal Set of Operations | Description |
| --- | --- | --- |
| clear | 0x0 | /* 0 */ |
| and | 0x1 | /* src AND dst */ |
| andReverse | 0x2 | /* src AND NOT dst */ |
| copy | 0x3 | /* src */ |
| andInverted | 0x4 | /* NOT src AND dst */ |
| noop | 0x5 | /* dst */ |
| xor | 0x6 | /* src XOR dst */ |
| or | 0x7 | /* src OR dst */ |
| nor | 0x8 | /* NOT src AND NOT dst*/ |
| equiv | 0x9 | /* NOT src XOR dst */ |
| invert | 0xa | /* NOT dst */ |
| orReverse | 0xb | /* src OR NOT dst */ |
| copyInverted | 0xc | /* NOT src */ |
| orInverted | 0xd | /* NOT src OR dst */ |
| nand | 0xe | /* NOT src OR NOT dst */ |
| set | 0xf | /* 1 */ |

In the table, the abbreviation "src" refers to a source image and "dst" refers to a destination image. In addition to the 2-operand bitwise operations described above, the present invention may also be applied to other bitwise operations, such as ternary and quaternary bitwise GDI operations.

In response, CPU 102 will copy out the destination area of the bitwise operation to a temporary image. This image is then fed as a source image to GPU 120. In addition, CPU 102 may lookup the precomputed texture for the requested bitwise operation. As shown in FIG. 2, CPU 102 has precomputed and stored various textures 202 for bitwise operations in its memory 110.

The precomputed textures 202 serve as a lookup table for GPU 120 in order translate the typical two dimensional data of legacy X Window system graphics to the three dimensional operations provided by GPU 120, In order to precompute textures 202, CPU 102 may perform the bitwise operation, such as AND, OR, XOR, etc., and store the result at a two dimensional coordinate specified by the operands. For example, the bitwise operation of two integers n and m would be stored at the two dimensional texture coordinate (n, m). One skilled in the art will recognize that such textures can be easily computed by CPU 102 and will only require a small amount of memory.

Next, GPU 120 will pass the source image and texture 202 to shader program 204. Shader program 204 is a set of instructions that is executed by GPU 120 to determine the final surface properties or shape of an object to be displayed. The use of shader program 204 allows system 100 to emulate the legacy graphics of X Windows Systems.

As noted, the shader program 204 may be enhanced in various ways. In some embodiments, shader program 204 is configured with an algorithm that emulates the two dimensional data of the legacy X Window bitwise operations using the three dimensional feature set of GPU 120. For example, one algorithm of the shader program 204 may be: for each pixel in the result, find the corresponding pixel values in the source images, and for each color channel in those source pixels, compute the destination color by using the source pixel channels as indices into the lookup texture 202.

In other embodiments, in addition to simple combinations of entire pixels, GPU 120 may also expose a planemask, which defines the set of bits in the destination that may be affected by the requested bitwise operation. Shader program 204 can be configured to account for this by simply adding stages to the rendering process. In particular, given that the above is a process to compute dst'=src ROP dst, where ROP is the bitwise operation in question, shader program 204 may execute multiple times to add planemask support.

For example, shader program 204 may employ the following equations:

a=src ROP dst;
b=a AND planemask;
c=dst AND NOT planemask; and thus
dst'=b AND c In this example, it is understood that the planemask stages will repeat the single pixel value of the planemask to cover the dimensions of the other operand. Other generalizations are possible, including efficient execution of ternary ROPs, such as Those Microsoft's Graphics Device Interface (GDI).

Shader program 204 may then complete its processing. Ultimately, shader program 204 will return as it outputs the final color of a given pixel in a scene for display on display 108.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of emulating legacy graphics bitwise operations, said method comprising:
   precomputing a texture for a bitwise operation selected from a group consisting of binary bitwise operations, ternary bitwise operations, and quaternary bitwise operations;
   receiving a requested bitwise operation;
   retrieving the texture corresponding to the requested bitwise operation;
   determining a destination area of the requested bitwise operation by a processor;
   providing a copy of the destination area as a source image and the retrieved texture to a graphics processing unit;
   texturing the source image based on the texture; and
   providing an output to a display based on the textured source image.

2. The method of claim 1, wherein receiving the requested bitwise operation comprises receiving an X Window System 2-operand bitwise operation.

3. The method of claim 1, wherein receiving the requested bitwise operation comprises receiving a requested AND operation.

4. The method of claim 1, wherein receiving the requested bitwise operation comprises receiving a requested OR operation.

5. The method of claim 1, wherein receiving the requested bitwise operation comprises receiving a requested XOR operation.

6. The method of claim 1, wherein receiving the requested bitwise operation comprises receiving a requested NOT operation.

7. The method of claim 1, wherein the texture is precomputed for ternary bitwise operations and wherein receiving the requested bitwise operation comprises receiving a requested ternary operation.

8. The method of claim 1, wherein the texture is precomputed for quaternary bitwise operations and wherein receiving the requested bitwise operation comprises receiving a requested quaternary operation.

9. An apparatus for emulating legacy graphics bitwise operations, said apparatus comprising:
- means for precomputing a texture for a bitwise operation selected from a group consisting of binary bitwise operations, ternary bitwise operations, and quaternary bitwise operations;
- means for receiving a requested bitwise operation;
- means for retrieving the texture corresponding to the requested bitwise operation;
- means for determining a destination area of the requested bitwise operation;
- means for providing a copy of the destination area as a source image and the retrieved texture to a graphics processing unit;
- means for texturing the source image based on the texture; and
- means for providing an output to a display based on the textured source image.

10. The apparatus of claim 9, wherein the means for receiving the requested bitwise operation comprises means for receiving an X Window System 2-operand bitwise operation.

11. The apparatus of claim 9, wherein the means for receiving the requested bitwise operation comprises means for receiving a requested AND operation.

12. The apparatus of claim 9, wherein the means for receiving the requested bitwise operation comprises means for receiving a requested OR operation.

13. The apparatus of claim 9, wherein the means for receiving the requested bitwise operation comprises means for receiving a requested XOR operation.

14. The apparatus of claim 9, wherein the means for receiving the requested bitwise operation comprises means for receiving a requested NOT operation.

15. The apparatus of claim 9, wherein the texture is precomputed for ternary bitwise operations and wherein the means for receiving the requested bitwise operation comprises means for receiving a requested ternary operation.

16. The apparatus of claim 9, wherein the texture is precomputed for quaternary bitwise operations and wherein the means for receiving the requested bitwise operation comprises means for receiving a requested quaternary operation.

17. A system configured to emulate legacy graphics bitwise operations comprising:
- a processor configured to compute a texture for a bitwise operation selected from a group consisting of binary bitwise operations, ternary bitwise operations, and quaternary bitwise operations, to determine a destination area of a requested bitwise operation, and to submit a copy of the destination area as a source image; and
- a graphics processing unit, coupled to the processor, configured by a shader program to find, for each pixel, corresponding pixel values in the source image, to compute, for each color channel in the pixels of the source image, a destination color by using source pixel channels as indices for lookup into the texture, and to output pixels to a display based on their corresponding destination color.

18. The system of claim 17, wherein the graphics processing unit comprises a three dimensional graphics engine.

19. The system of claim 17, wherein the processor is configured to compute textures for X Windows 2-operand bitwise operations.

20. The system of claim 17, wherein the graphics processing unit is configured to execute the shader program multiple times to support a planemask.

21. The system of claim 17, wherein the texture is precomputed for ternary bitwise operations and wherein the shader program is configured to emulate a requested ternary operation.

22. The system of claim 17, wherein the texture is precomputed for quaternary bitwise operations and wherein the shader program is configured to emulate a requested quaternary operation.

* * * * *